UNITED STATES PATENT OFFICE.

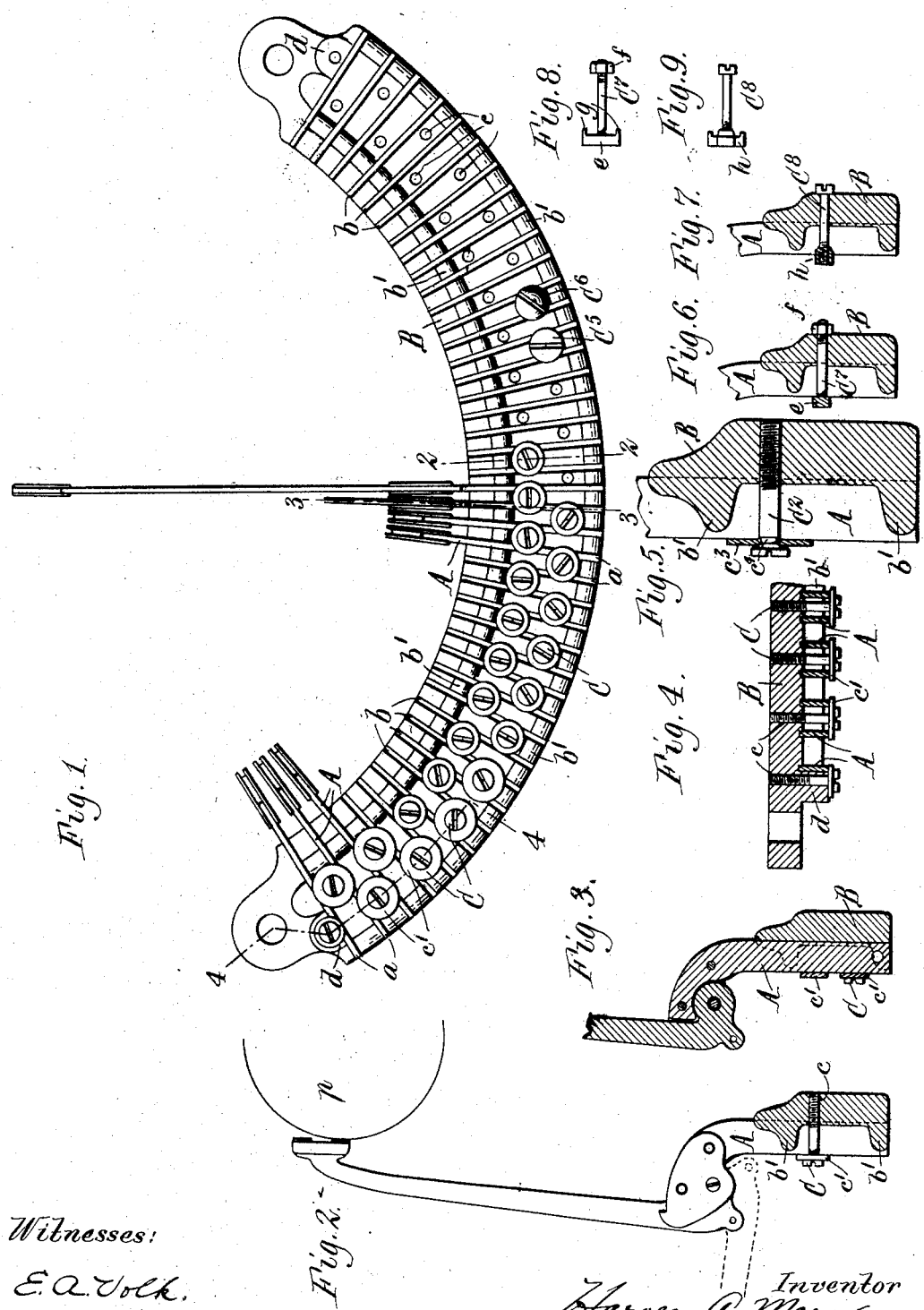

HARVEY A. MOYER, OF SYRACUSE, NEW YORK, ASSIGNOR OF ONE-HALF TO EMMIT G. LATTA, OF SYRACUSE, NEW YORK.

SECURING MEANS FOR THE HANGERS FOR TYPE-WRITING MACHINES.

No. 832,802. Specification of Letters Patent. Patented Oct. 9, 1906.

Application filed April 2, 1906. Serial No. 309,330.

*To all whom it may concern:*

Be it known that I, HARVEY A. MOYER, a citizen of the United States, residing at Syracuse, in the county of Onondaga and State of New York, have invented a new and useful Improvement in Securing Means for the Hangers of Type-Writing Machines, of which the following is a specification.

This invention relates to the securing means for the type-bar hangers or bearings of type-writing machines in which the hangers or bearings are separately secured to and adjustable on a segment or support, and more particularly to fastening devices in the nature of improvements or modifications of the securing means disclosed in my application for United States Letters Patent, filed February 17, 1906, Serial No. 301,823.

In front-strike type-writing machines the hangers must be constructed and arranged to locate the type-bars in close relation and of course must be securely and rigidly fastened. It is desirable that they be arranged in radial lines with the type-bar pivots located on the same arc concentric with the printing-point, that they be capable of being easily and quickly adjusted radially on the segment or detached and replaced, that they project beyond the supporting segment or part so that they can be twisted or bent slightly to aline some of the type-bars that require extra space in the basket, and that the means employed be inexpensive, strong, and durable. To accomplish these several results is the object of this invention. Hangers, such as shown in my said application, formed with flat attaching portions of uniform thickness and width, which can be stamped from sheet metal and ground true, are most desirable, and the means disclosed in said application for securing the hangers in the radial slots of the segment are very reliable and convenient, but the clamping-plate employed must be very carefully made from high-grade material to insure the best results and is more expensive than the means herein described and claimed.

In the accompanying drawings, Figure 1 is a front elevation of a segment for a front-strike type-writing machine with several hangers secured thereon by means embodying the invention, one of said hangers carrying a type-bar, different forms of the fastening devices being shown on different portions of the segment. Fig. 2 is a cross-section thereof in line 2 2, Fig. 1. Fig. 3 is a cross-section thereof in line 3 3, Fig. 1. Fig. 4 is a fragmentary longitudinal section thereof in line 4 4, Fig. 1. Figs. 5, 6, and 7 are fragmentary cross-sectional elevations of the segment and a hanger, showing securing devices of different construction. Figs. 8 and 9 are plan views, detached, of the securing devices shown in Figs. 6 and 7, respectively.

Like letters of reference refer to like parts in the several figures.

A represents the hangers, and B the segment or support for the same. The hangers, like those shown in said application, have straight flat attaching shanks or portions $a$ of substantially uniform thickness and width throughout. Except for this form of the shanks the hangers may be of any suitable construction. The segment or support preferably consists of a curved casting having shallow transverse slots or seats $b$ in one face radial to the printing-point to receive the hangers and; is provided at the inner and outer edges of said face with projecting ribs or flanges $b'$, through which said slots extend. The hanger-shanks are seated in these slots and are held thereby in true radial relation to the printing-point. The segment is also similar to that shown in said application, but the hanger-slots are formed in the body of the segment as well as in its flanges, and the hangers are therefore braced throughout the width of the segment from lateral deflection.

In a front-strike machine the segment is arranged vertically below the platen and in the segment illustrated the hangers are secured to the front thereof, (see Fig. 2,) in which the circle $p$ indicates the platen, but the fastening means are not limited to such arrangement. In front-strike machines, in which each type-bar carries a plurality of type, the angularity of the type-heads with respect to the bars increases from the center toward the ends of the segment and more space is required between the type-bars at the ends of the segment than between those in the center. In order, therefore, to enable the whole series of type-bars to be arranged on as short a segment as possible, the central hangers are placed as close as permitted and the distance between the hangers is gradually increased toward the ends of the segment.

The hanger-slots in the segment are consequently spaced differentially, as shown in Fig. 1.

The fastening means for the hangers differ from those described in said application, as will now be explained. The fastening devices are located and secured to the segment, between the hangers and bear on and clamp the hangers in the slots, and preferably consists of screws, bolts, or the like C, secured in holes c in the segment and having heads or parts to engage the hanger-shanks. In order to reduce the number of screws to the minimum, each one bears against and assists in holding the two hangers, between which it is located, so that while there are two screws for each hanger on opposite sides thereof only one more screw than the number of hangers is required. The screws are also preferably arranged in staggered order or in two concentric rows, as shown in Fig. 1, thereby enabling the use of larger and stronger screws than could otherwise be employed. By this arrangement also each hanger is clamped at two points in its length, and is therefore more firmly held. Screws similarly located are employed in the construction disclosed in said application, but in said construction a clamping-plate common to all the hangers is used, whereas in the present arrangement the plate is omitted and each device acts directly on the hanger. As the screw-bodies project from the segment in the spaces between the ribs $b'$ thereof and are of less diameter than the distance between the hangers, they can spring slightly if one hanger is slightly wider than the other to cause the head to bear equally on both hangers, but as the hanger-shanks and the slots in the segment are made as nearly uniform as possible the screws are not deflected far enough to do any harm. The outermost screw at each end of the segment only bears on one hanger, and to prevent these two screws from springing the segment is provided at each end with a boss or part $d$, Figs. 1 and 4, into which the screw is fastened, which extends out flush with the outer edge of the hanger.

In the construction shown in Figs. 1 to 4 the screws C have threaded ends screwed into threaded holes in the segment and integral heads which bear on the outer edges of the hanger-shanks. The heads of the screws shown at the left of Fig. 1 have flanges or collars $c'$ large enough to project over and bear on two hangers, while the slots for the screw-driver are made in end portions of smaller diameter, the object being to guard against twisting the heads off by the careless use of a large screw-driver. These screw-heads are made in two sizes, as shown, the smaller size being used at the central part of the segment, where the hangers are nearer together, and the larger size at the end portions of the segment, where the hangers are spaced farther apart.

A cheaper but desirable arrangement is secured by employing ordinary screws with washers placed between the heads of the screws and the hangers, as shown in Fig. 5, in which $C^2$ is the screw and $c^3$ the washer. The washer preferably has a slightly concavo-convex center adapted to spring into a shallow groove $c^4$ in the screw beneath the head when the screw is driven home, whereby the washer is connected to the screw and is withdrawn from the hanger when the screw is loosened, so as not to interfere with the ready replacing of a detached hanger. The under side of the screw-head is made convex to fit the cavity of the washer. The washer thus forms an attached flange or collar on the screw and the construction is cheaper than a screw machined with a large integral head or collar from solid stock.

While screws with flanged heads, such as described, are preferred, screws with ordinary large flat or convexed heads, such as shown at $C^5$ and $C^6$ at the right in Fig. 1, could be used.

The described construction of the segment, hanger, and securing devices or screws not only saves cost in manufacture, but effects a most important saving in time in assembling the parts, and particularly in alining the type. The screws can be started in their seats in the segment by cheap labor before the segment is secured in the machine and never have to be removed therefrom. The shanks of the hangers, to which the type-bars have already been attached, are simply slipped endwise into the radial slots in the segment under the screw-heads and are secured by driving in the screws. To release a hanger for adjusting it to aline the type or to remove the hanger, it is only necessary to loosen the two screws at the opposite sides of this hanger by turning the screws far enough to relieve the pressure thereof on the hanger. The hangers are detached after loosening the screws by pulling them endwise out of their slots in the segment under the screw-heads, leaving the screws in place ready for instant application of the screw-driver when it is desired to again secure the hanger. The screws do not have to be screwed out of their holes in the segment. This is important, because the segment is located under the type-bars, where the screws are hard to reach, and it would be difficult and require considerable time to start the screws in the holes in the segment after they were once removed; but the screws can be readily reached and turned to tighten or loosen them with a long screw-driver. A great saving of time is effected, therefore, in alining the type, as in this operation it is usually necessary to remove each type-bar and its hanger several times. Another important consideration is that there is much less wear on the screws during the process of alining, and the screws do not work loose, as is the case with screws which have to be entirely removed whenever a hanger has to be detached. From Fig. 1 it will be seen that when any desired hanger has to be removed only the two screws at the opposite sides thereof have to be loosened. These screws also assist in holding the next two hangers on opposite sides of the one removed; but these hangers are firmly held by the other two screws bearing on them, so that in loosening one hanger the others are not disturbed or loosened.

In the construction above described the screws must be reached from the front of the machine and the hangers pulled up endwise from beneath the screw-heads from their slots in the segment. In some machines there may be parts which will prevent ready access to the screws from the front or such endwise movement of the hangers from the segment, and to enable the hangers to be loosened from the rear of the machine and to be removed forwardly from between the screws or securing devices the latter can be constructed as shown in Figs. 6 to 9. In these constructions the hangers are the same as in the construction above described, and the segment is the same, except that the holes for the screws are not threaded.

As shown in Figs. 6 and 8, the screw or bolt $C^7$ is provided with a T-head $e$, which is adapted to overhang and bear on the outer edges of the two hanger-shanks at opposite sides thereof, and a nut $f$ is screwed on the threaded end of the screw or bolt which projects rearwardly through the segment. The T-heads are of less width than the spaces between two adjacent hangers, so that after the nuts are loosened two or more turns the heads of the screws can be turned to a position parallel with and between the hangers, when the hanger can be moved forwardly out of its seat between its two securing-screws. The T-head is provided at opposite ends with small projections $g$, adapted to embrace the hangers to prevent the heads from turning when the nuts are tightened up.

Figs. 7 and 9 show a reversal of this construction in which the screw $C^8$ has a slotted head located in rear of the segment, and its threaded front end screws into a cross-head or nut $h$, similar in shape to the T-head shown in Figs. 6 and 8 and adapted to similarly engage the hanger-shanks. These cross-heads can be turned, as above described, after the screws are loosened to permit the removal of the hangers forwardly from their seats.

In all of the constructions described a series of hangers are secured to their segment or supporting part by a series of screw-securing devices located between the hangers and arranged and constructed to permit the removal of the hangers or the adjustment thereof without detaching the screws from the segment and each securing device assists in holding two hangers. Likewise each hanger is secured at two different points in its length and any one hanger may be detached without loosening or disturbing the neighboring hangers on the segment by simply loosening the two securing devices for the hanger to be detached.

I claim as my invention—

1. In a type-writing machine, the combination of a support, a series of hangers having plain straight attaching portions arranged side by side on said support, and devices located between the hangers for detachably securing the hangers on the support, the hangers being removable from the support without detaching said securing devices, substantially as set forth.

2. In a type-writing machine, the combination of a support having a series of spaced slots, a series of hangers having plain straight attaching portions seated in said slots, and screw devices secured to said support between said hangers for securing the hangers to the support, substantially as set forth.

3. In a type-writing machine, the combination of a segment having a series of spaced radial slots, a series of hangers having plain straight attaching portions seated in said slots, and screw devices secured to the segment between said hangers for securing the hangers to the segment, substantially as set forth.

4. In a type-writing machine, the combination of a support, a series of hangers arranged side by side on said support, and a series of screw devices secured to said support between said hangers, each of said devices bearing against the two hangers on the opposite sides thereof for securing the hangers on the support, substantially as set forth.

5. In a type-writing machine, the combination of a support, a series of hangers arranged side by side on said support, and a series of screw devices secured to said support between said hangers, said screw devices being arranged to bear against said hangers at different points in their length, substantially as set forth.

6. In a type-writing machine, the combination of a support, a series of hangers arranged side by side on said support, and a series of screw devices secured to said support between said hangers and arranged alternately in two rows, each of said screw devices having a part which bears on the two hangers on opposite sides thereof, substantially as set forth.

7. In a type-writing machine, the combination of a segment, a series of hangers arranged radially on said segment, and a series of screw devices secured to said segment between said hangers and arranged alternately in two concentric rows, the two screw devices located on opposite sides of each hanger having parts which bear on said hanger, substantially as set forth.

8. In a type-writing machine, the combination of a segment provided with radial slots, a series of hangers seated in said slots, and a series of screw devices secured to the segment between the hangers and arranged alternately in two concentric rows, each of said screw devices having a part which bears on the two hangers at opposite sides thereof, substantially as set forth.

9. In a type-writing machine, the combination of a support, a series of hangers, and a series of screw devices secured to said support and arranged so that each screw device coöperates with two hangers to secure the same on the support, each hanger being removable without disturbing the other hangers by loosening the screw devices at the opposite sides thereof, substantially as set forth.

10. In a type-writing machine, the combination of a segment, a series of hangers arranged radially on said segment, and a series of screws secured to the segment between said hangers and each bearing directly on the two hangers at opposite sides thereof to clamp the hangers on the segment, said hangers being removable from the segment while the screw devices are in place thereon, substantially as set forth.

11. In a type-writing machine, the combination of a segment provided with radial slots, a series of hangers having straight attaching portions seated in said slots, and a series of screw devices secured to said segment between said hangers and arranged alternately in two concentric rows, each of said screw devices having a part directly engaging the two hangers on opposite sides thereof to clamp the hangers to the segment, substantially as set forth.

Witness my hand this 26th day of March, 1906.

HARVEY A. MOYER.

Witnesses:
CHESTER U. REID,
FRANK E. REID.